(12) United States Patent
Nishimura et al.

(10) Patent No.: US 9,696,718 B2
(45) Date of Patent: Jul. 4, 2017

(54) METHOD FOR TROUBLE MANAGING OF EQUIPMENT

(75) Inventors: Nobuhiko Nishimura, Nagasaki (JP); Fumitoshi Sakata, Tokyo (JP); Mayumi Saito, Takasago (JP); Kouji Satake, Takasago (JP); Shintaro Kumano, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 12/921,494

(22) PCT Filed: Sep. 9, 2009

(86) PCT No.: PCT/JP2009/065768
§ 371 (c)(1),
(2), (4) Date: Nov. 10, 2010

(87) PCT Pub. No.: WO2010/061681
PCT Pub. Date: Jun. 3, 2010

(65) Prior Publication Data
US 2011/0046995 A1   Feb. 24, 2011

(30) Foreign Application Priority Data
Nov. 25, 2008   (JP) .................................. 2008-299451

(51) Int. Cl.
*G06F 11/30*   (2006.01)
*G05B 23/02*   (2006.01)
(Continued)

(52) U.S. Cl.
CPC ......... *G05B 23/0278* (2013.01); *G01H 17/00* (2013.01); *G06Q 10/04* (2013.01);
(Continued)

(58) Field of Classification Search
CPC ............... G06Q 10/20; G06Q 10/0631; G05B 23/0278; G01H 17/00; G01N 29/14; Y02P 90/30
See application file for complete search history.

(56) References Cited

U.S. PATENT DOCUMENTS 5,130,936 A * 7/1992 Sheppard ............ G06F 11/2257
128/925
5,566,092 A * 10/1996 Wang .................. G05B 19/4184
700/159
(Continued)

FOREIGN PATENT DOCUMENTS

CN   1514209 A   7/2004
CN   1845605 A   10/2006
(Continued)

OTHER PUBLICATIONS

Ibarguengoytia, Pablo, Sucar Luis Enrique, and Vadera, Sunil, 2001, Real Time Intelligent Sensor Validation, IEEE Transactions on Power Systems, vol. 16, No. 4, pp. 770-775.*
(Continued)

*Primary Examiner* — Matthew Gart
*Assistant Examiner* — Stephen S Swartz
(74) *Attorney, Agent, or Firm* — Westerman, Hattori, Daniels & Adrian, LLP (57) ABSTRACT

A method for trouble managing in equipment is provided, with which optimal timing of repairing the equipment and occurrence of malfunction probable to occur concurrently with present malfunction or later stage can be inferred with sufficient accuracy, and which can be adopted for large-scale equipment used in a plant. The method for trouble managing of equipment by monitoring operation condition of the equipment with a monitoring means and inferring cause of malfunction of the equipment by an inference means which infers the cause of the malfunction using measured data
(Continued)

concerning the operation condition obtained by the monitoring means when malfunctions occur as nodes of the inference means, comprises selecting acoustic data most similar to sound emitted from the equipment in which malfunction has occurred from among a plurality of acoustic data provide beforehand, selecting morphologic data most similar to a pattern of operating condition in the equipment from among a plurality of morphologic data provide beforehand, adding the selected acoustic data and the selected morphologic data to the nodes, and performing inference of cause of the malfunction of the equipment by a first Bayesian network base on the nodes.

5 Claims, 6 Drawing Sheets

(51) Int. Cl.
  *G01H 17/00* (2006.01)
  *G06Q 10/04* (2012.01)
  *G06Q 10/06* (2012.01)
  *G06Q 10/00* (2012.01)
  *G06Q 50/04* (2012.01)

(52) U.S. Cl.
  CPC ......... *G06Q 10/06* (2013.01); *G06Q 10/0631* (2013.01); *G06Q 10/20* (2013.01); *G06Q 50/04* (2013.01); *Y02P 90/30* (2015.11)

(56) References Cited

U.S. PATENT DOCUMENTS

| | | | |
|---|---|---|---|
| 6,535,865 B1 | 3/2003 | Skaaning et al. | |
| 7,113,988 B2* | 9/2006 | Chirashnya et al. | 709/224 |
| 7,260,501 B2* | 8/2007 | Pattipatti | G05B 23/0243 702/182 |
| 7,475,122 B2* | 1/2009 | Azpitarte | 709/217 |
| 8,271,200 B2* | 9/2012 | Sieracki | G10L 15/02 702/19 |
| 2003/0204333 A1 | 10/2003 | Asatsu et al. | |
| 2004/0033799 A1* | 2/2004 | Fontius | 455/423 |
| 2006/0241916 A1* | 10/2006 | Sieracki | 702/189 |
| 2008/0004904 A1* | 1/2008 | Tran | 705/2 |
| 2009/0094076 A1* | 4/2009 | Reddy | G06Q 10/04 705/7.41 |
| 2010/0235145 A1* | 9/2010 | Ascari | B25J 9/1612 702/190 |

FOREIGN PATENT DOCUMENTS

| | | |
|---|---|---|
| CN | 1845607 A | 10/2006 |
| DE | 10 2004 043 875 A1 | 3/2006 |
| JP | 64-035237 A | 2/1989 |
| JP | 64-035238 A | 2/1989 |
| JP | 4-299740 A | 10/1992 |
| JP | 6-241956 A | 9/1994 |
| JP | 2001-075808 A | 3/2001 |
| JP | 2003-303244 A | 10/2003 |
| JP | 2003-315213 A | 11/2003 |
| JP | 2005-309077 A | 11/2005 |
| JP | 2005-309078 A | 11/2005 |
| JP | 2007-025878 A | 2/2007 |
| JP | 2007-074290 A | 3/2007 |
| JP | 2007-188287 A | 7/2007 |
| JP | 2008-224745 A | 9/2008 |

OTHER PUBLICATIONS

Yam RCM, Tse PW, and Tu P, 2001, Intelligent Predictive Decision Support System for Condition-Based Maintenance, The International Journal of Advanced Manufacturing Technology, vol. 17, pp. 383-391.*
Bunea, Cornel, Mazzuchi, Thomas, Sarkani Shahram, and Chang Hai-Chin, Jan. 2008 Reliability Engineering and System Safety, vol. 93, Issue 1, pp. 14-27.*
Mosleh, Ali—Hilton, Richard—Browne, Peter, 1985, Bayesian Probabilistic Risk Analysis, ACM Sigmetrics—Performance Evaluation Review, vol. 13, No. 1.*
Stori S Dey_2005_A Bayesian Network Approach to Root Cause Diagnosis of Process Variations, International Journal of Machine Tools & Manufacturing vol. 45, pp. 75-91.*
May, Wenbin—Zhang, Xiaojun—Zhou-Yong, Lin, 2008, Application of Morphological Filter in Pulse Noise Removing of Vibration Signal, IEEE Computer Society, pp. 132-135 (hereafter Wenbin).*
Acoustics—Wikipedia, the free encyclopedia.*
Morphological analysis—Wikipedia, the free encyclopedia.*
Merola, Simona and Vaglieco Bianca, 2007, Knock investigation by flame and radical species detection in spark ignition engine for different fuels, Energy Conversion Management, pp. 2897-2910.*
Zheng GT and Leung, 2002, Internal Combustion Engine Noise Analysis with Time-Frequency Distribution, Journal of Engineering for Gas Turbines and Power, vol. 124, pp. 645-649.*
International Preliminary Report on Patentability (Form PCT/IB/373) of International Application No. PCT/JP2009/065768 issued Jul. 5, 2011 with Forms PCT/ISA/237.
International Search Report of PCT/JP2009/065768, mailing date Nov. 24, 2009.
Office Action dated Jun. 13, 2012 issued in corresponding Japanese Patent Application No. 2008-299451. English Translation.
Korean Notice of Allowance dated Sep. 25, 2012, issued in corresponding Korean patent application No. 10-2010-7020443.
The Notice of Allowance effective Feb. 13, 2013 issued to the corresponding Mexican Application No. MX/a/2010/010750.
The Notice of Allowance effective Sep. 4, 2012 issued to the corresponding Japanese Appliation No. 2008-299451.
The Decision on Rejection dated Jul. 3, 2014, issued in corresponding CN application No. 200980111139.0 with English translation (14 pages).
Notice of Allowance dated May 12, 2015, issued in corresponding GB Patent Application No. 1018260.8 (2 pages).
Notice of Allowance dated Feb. 4, 2016, issued in counterpart Chinese Patent Application No. 200980111139.0, with Engish translation. (4 pages).
Examination Report dated Jan. 25, 2017, issued in counterpart Indian Application No. 6495/DELNP/2010 (8 pages)

* cited by examiner

METHOD FOR TROUBLE MANAGING OF EQUIPMENT

TECHNICAL FIELD

The present invention relates to a method for trouble managing of equipment, specifically to a method with which the cause of the trouble can be inferred with sufficient accuracy and which can be adopted for equipment used in large-scale machinery such as a gas turbine installed in a plant.

BACKGROUND ART

In a gas-turbine-combined-cycle power plant, land boiler plant, wind power plant, etc., when an alarm call telling occurrence of abnormality in the equipment in the plant such as abnormal noise or abnormal measured value is emitted, it is necessary to guess or infer the cause of the abnormality and implement measures such as making repairs depending on the cause.

Therefore, when malfunction occurs in the equipment in the plant, generally an operator in the plant guesses the cause of the malfunction based on his or her own experience and past records in the plant and takes an action probable to solve the cause conventionally (conventional method 1).

In another conventional method (conventional method 2), when malfunction occurs in the equipment in the plant, the operator informs a maintenance expert of the plant maker of the condition of the malfunction, the expert of the plant maker guesses the cause of the malfunction based on the malfunction database of the plant maker and informs the operator of the result of inference, and the operator takes an action probable to solve the cause.

In the conventional method 1, presence of an operator having sufficiently specialized knowledge and skill is indispensable, however, it is difficult to acquire or train such an expert in short time, and it is possible to happen that a false action is taken when such an expert can not be secured and damage due to the malfunction increases.

In the conventional method 2, similarly presence of an expert of the plant maker having sufficiently specialized knowledge and skill is indispensable, however, it is difficult to secure or train such an expert in the plant maker in short time, and it is possible to happen that a false action is taken when such an expert can not be secured and damage due to the malfunction increases.

In patent literature 1 is disclosed a method which is adopted as an automatic diagnosing method in a printer not in equipment in a plant. According to the method, a Bayesian network is utilized to infer the cause of the malfunction probabilistically and actions probable to solve the cause of the malfunction are informed to the operator together with effect and cost of implementation of each of the actions.

However, with the method disclosed in the patent literature 1, although sufficiently specialized knowledge and skill of experts concerning printers are collected and inputted in the Bayesian network, information of sound and information concerning shape or pattern of malfunction, which is difficult to be quantified but valuable for inferring causes of malfunction in printers are not adopted in the network, and there is a possibility that the result of inference is not sufficient in accuracy.

In the case of large-scale equipment used in a plant, it is necessary to continue operation of the equipment for extended period of time as long as possible, because expenses pile up when once the operation of the equipment is stopped. Therefore, information for determining whether to bring the equipment to a halt to repair, or whether to continue the operation to the weekend and then to repair, or whether to continue the operation under restricted operation condition until next periodic overhaul, is important.

According to the method of the patent literature 1, concrete actions to take against malfunction can be taught, however, they are for coping with malfunction in a printer which is a small-scale equipment, and information concerning timing of halting operation of the equipment, which is important in large-scale equipment as mentioned above, can not be provided.

Further, although concrete actions against malfunction are taught, a method to infer another malfunction probable to occur after the action is taken due to deterioration and method to confirm the deterioration is not disclosed.

Therefore, the method disclosed in the patent literature 1 which is art of automatic diagnosis of printers can not be adopted for large-scale equipment used in plants.

The patent literature 1: Japanese Laid-Open Patent Application No. 2001-75808.

SUMMARY OF THE INVENTION

The present invention was made in light of the problems of the conventional art, and the object of the invention is to provide a method for managing trouble in equipment, with which most suitable timing for repairing malfunction, and malfunction probable to occur concurrently with the present malfunction or later stage can be inferred with sufficient accuracy, and which can be applied to large-scale equipment used in plants.

To attain the object, the present invention proposes a method for trouble managing of equipment by monitoring operation condition of the equipment with a monitoring means and inferring cause of malfunction of the equipment by an inference means, which infers the cause of the malfunction using as nodes of the inference means the measured data concerning the operation condition obtained by the monitoring means when malfunction occurs, the method comprising; selecting acoustic data most similar to sound emitted from the equipment in which malfunction has occurred from among a plurality of acoustic data provide beforehand, selecting morphologic data most similar to a pattern of malfunction in operating condition in the equipment from among a plurality of morphologic data provide beforehand, adding the selected acoustic data and the selected morphologic data to the nodes, and performing inference of cause of the malfunction of the equipment by a first Bayesian network base on the nodes.

As data useful to clarify causes of malfunctions of equipment can be cited sound emitted from a malfunctioning part, color of the malfunctioning part, or combustion condition in the equipment, although it is difficult to represent them numerically.

As to sound, it is possible to obtain information with subjectivity of the operator of the equipment excluded as much as possible by allowing the operator to select from among a plurality of noises which occur from different causes and prepared beforehand a noise most similar to the noise the operator is actually hearing emitting from the equipment.

As to morphologic information, it is possible to obtain information with subjectivity of the operator excluded as much as possible by allowing the operator to select from among a plurality of morphologic conditions of phenomena which occur in the part of malfunction of the equipment and prepared beforehand a morphologic condition most similar to the morphologic condition the operator is actually observing in the equipment.

By adding the acoustic information and morphologic information obtained in this way with subjectivity of the operator excluded as much as possible to the nodes, and inferring cause of malfunction by using the Bayesian network, the inference means, based on the acoustic and morphologic information and said malfunction data concerning sound and morphologic conditions and so on obtained by the monitoring means when malfunctions occur, accuracy of inference of the case of malfunction can be improved.

It is preferable that a second Bayesian network is established on correlation between inference of cause of past malfunction of the equipment and actual repair implemented responding to the inferred cause of the malfunction, and strategy to take measure against the cause of the malfunction which is inferred as highly probable to be the cause by the first Bayesian network is inferred by the second Bayesian network.

When a maintenance expert of a plant maker utilizes for example the method of trouble managing of the invention, he corrects the information about the case of malfunction of the equipment from the operator of the plant in which the equipment is installed, infers cause of the malfunction by the method of the invention, and inform the operator of the inference. By establishing the second Bayesian network of correlation between inferences of causes of malfunctions obtained on the equipment in the plant in past times and modification or repair work actually performed responding to the inferences, modification or repair work highly probable to be performed for the equipment can be inferred by the second Bayesian network. That is, modification or repair work that the user of the plant may be implicitly thinking of implementing can be inferred, and information on the modification or repair work can be offered to the plant user.

The plant user can take actions speedily when receiving information on the modification or repair work together with inference of the cause of the malfunction.

Further, the maintenance expert of the plant maker can offer the inference of the cause of malfunction together with the highly accurate inference of modification or repair work which is highly probable to be implemented to the plant user, so, the plant maker can timely promote sales of parts required for the modification or repair.

It is preferable that expense required to repair the equipment or analogous equipment in a case appropriate action was not taken responding to inference of cause of malfunction in past times are corrected in a database together with said inferences, probability of occurrence of malfunction which may occur if present malfunction is neglected is inferred by the first Bayesian network base on the database, and risk cost is calculated by multiplying the inferred probability by the expense required to repair in a case appropriate action was not taken responding to inference of cause of malfunction and represented to the plant user.

As the risk cost to be born when the malfunction is neglected without taking any action can be presented numerically, it is contributory for deciding timing of repair, that is, whether to halt the malfunctioning equipment promptly to repair the malfunction, to allow the equipment to be operated until operation closedown day of the equipment in the weekend, or to continue operation of the equipment until periodical overhaul.

It is preferable that the expense to repair the present malfunction is estimated and compared with the risk cost.

By estimating the expense required for repairing the present malfunction of the equipment and comparing the estimation with the risk cost to be born if the malfunction is neglected, whether the malfunction should be repaired at an early time or not can be judged based on quantitative inference and judgment becomes easier.

In the case the maintenance expert of the plant maker utilizes the invention, whether it is most suitable to repair the present malfunction early from a viewpoint of life cycle cost of the equipment or not can be explained quantitatively to the client, so reliability of the maintenance expert of the plant maker can be improved.

It is preferable that a time series data of causes of malfunction occurred in the equipment is established, the time series data is inputted to the first Bayesian network, and causes of malfunctions highly probable to occur next to the present malfunction and probabilities of their occurrence are inferred.

By establishing time series data in which the inferences of causes of malfunction are arranged in time series and inputting the time series data to the first Bayesian network, malfunction highly probable to occur next to some malfunction just occurred can be inferred. Therefore, by inspecting whether there is a symptom of occurrence of the inferred malfunction or not on an occasion for periodical inspection, etc., proactive measures can be taken. When some malfunction occurs, malfunction apt to occur next can be inferred, so, malfunctions actually occurred in the past can be selected as inspection items in periodical inspection of the equipment, and inspection can be carried out efficiently.

As has been described heretofore, according to the invention, a method for trouble managing in equipment can be provided, with which optimal timing of repairing the equipment and occurrence of malfunction probable to occur concurrently with some malfunction or later stage can be inferred with sufficient accuracy, and which can be adopted for large-scale equipment used in a plant.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
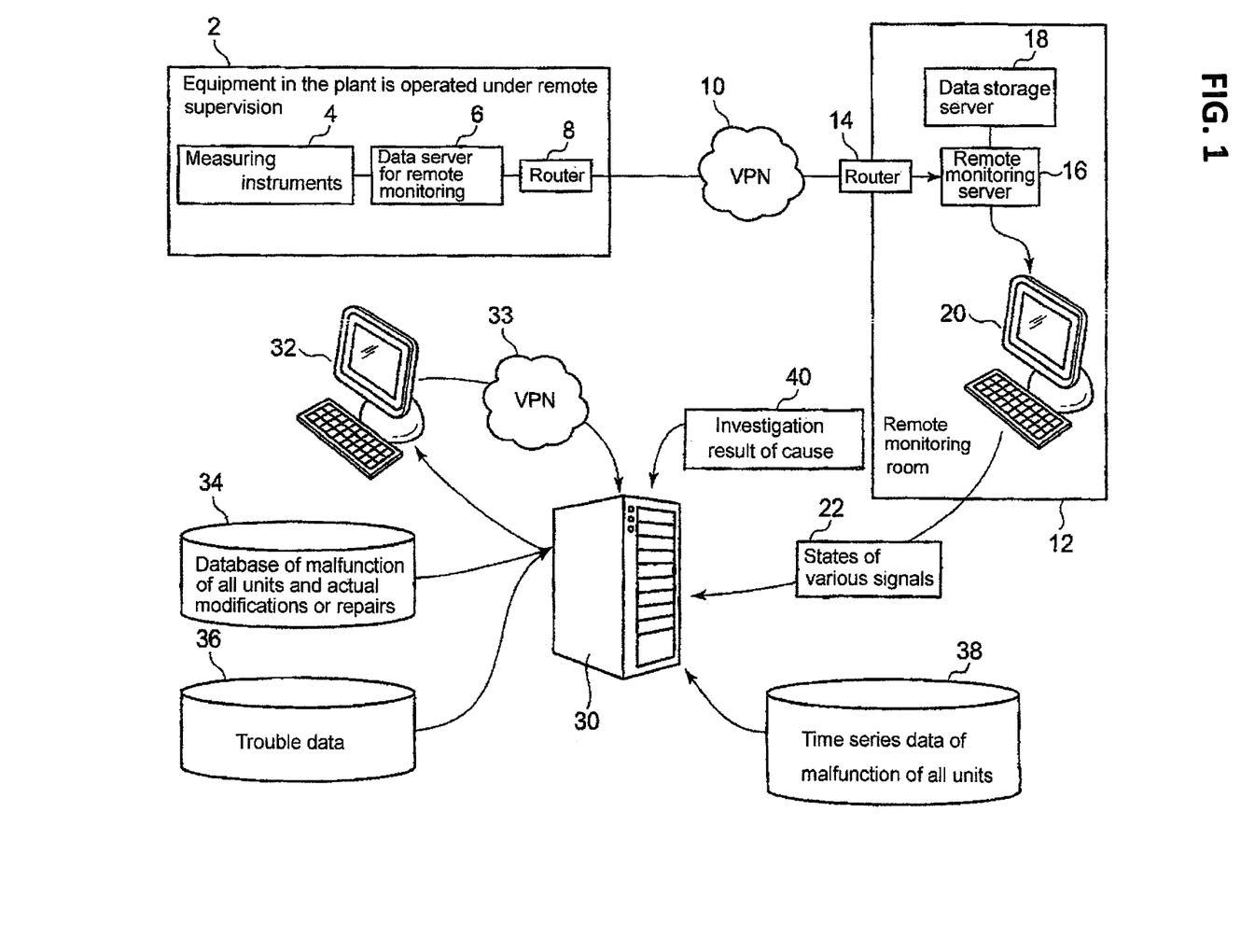
FIG. 1 is a schematic representation of a remote control system for implementing the method of managing trouble in equipment according to the present invention.

FIG. 1 is a schematic representation of a remote control system for implementing the method of managing trouble in equipment according to the present invention. The method of managing trouble in equipment by remote management will be explained referring to an example of embodiment shown in FIG. 1.

To be more specific, such a managing method will be explained that a maintenance expert of plant maker monitors the operating condition of the equipment constituting the plant at a location remote from the plant, and when malfunction occurs, the expert infers the cause of the malfunction and informs the user of the plant (client) of the information concerning the cause.

Referring to FIG. 1, equipment in the plant (hereafter referred to as the plant) 2 is operated under remote supervision.

Operation data of various measuring instruments 4 is collected by a data server 6 for remote monitoring in the plant, and the collected operation data is sent to a remote monitoring room 12 located remote from the plant 2 to be monitored always. When a malfunction occurs in the equipment constituting the plant 2, states of various signals 22 of the operation data is inputted to a Bayesian network system 30 having a Bayesian network therein as nodes from a monitoring terminal 20 in the remote monitoring room 12, and concurrently acoustic and morphologic data of the malfunctioning part are inputted to the Bayesian network system 30 from a client terminal 32 as nodes by a method mentioned later. The cause of the malfunction of the plant is inferred by the Bayesian network based on the nodes.

Only a single plant 2 is remote-controlled in FIG. 1, however, generally a plurality of plants are remote-controlled in the remote monitoring room 12.

When a gas turbine in the plant 2 is remote-controlled, numerical values of operation data such as rotation speed, output, control signals, and temperature, flow rate, and signal at each of various parts of the gas turbine detected by the various types of measuring instruments 4 attached to the gas turbine are sent to the data server 6 for remote monitoring. Then the data is sent via a router 8, VPN (Virtual Private Network) 10, and router 14 to a remote monitoring server 16 in the remote monitoring room 12 in real time as real time data, and concurrently the data is stored for a certain period at one second frequency as historical data in the data server 6 for remote monitoring. The historical data stored in the data server 6 is rendered into data of one minute frequency and sent via the router 8, VPN 10, router 14, and remote monitoring server 16 to a data storage server 18 to be stored there.

The real time data sent to the remote monitoring server 16 can be confirmed at any time by a maintenance expert of the plant maker residing in the remote monitoring room 12 with the monitoring terminal 20.

Control values, or management values are determined for monitoring the real time data, and tendency of change of the data is monitored by tendency monitoring logic. When the real time data exceed the management data or the tendency of change is judged to have exceeded a prescribed tendency of change by the tendency monitoring logic, an alarm is emitted.

When the alarm is emitted, the real time data is inputted to the Bayesian network system 30 as nodes.

Further, when the alarm is emitted, the maintenance expert of the plant maker residing in the remote monitoring room 12 informs the operator of the plant 2 that the alarm is emitted, and the operator received the information of acoustic data and morphologic data inputted to the client terminal 32 in a way explained later. The inputted data is then inputted to the Bayesian network system 30 via a VPN 33 as nodes.

When the nodes are inputted with the data, cause of the occurrence of the malfunction is inferred by the Bayesian network in the Bayesian network system 30 and outputted.

It is preferable that the informing the operator of the plant of the emission of the alarm is performed automatically not by the maintenance expert of the plant maker residing in the remote monitoring room 12 from a viewpoint of preventing human error.

Figure 2:
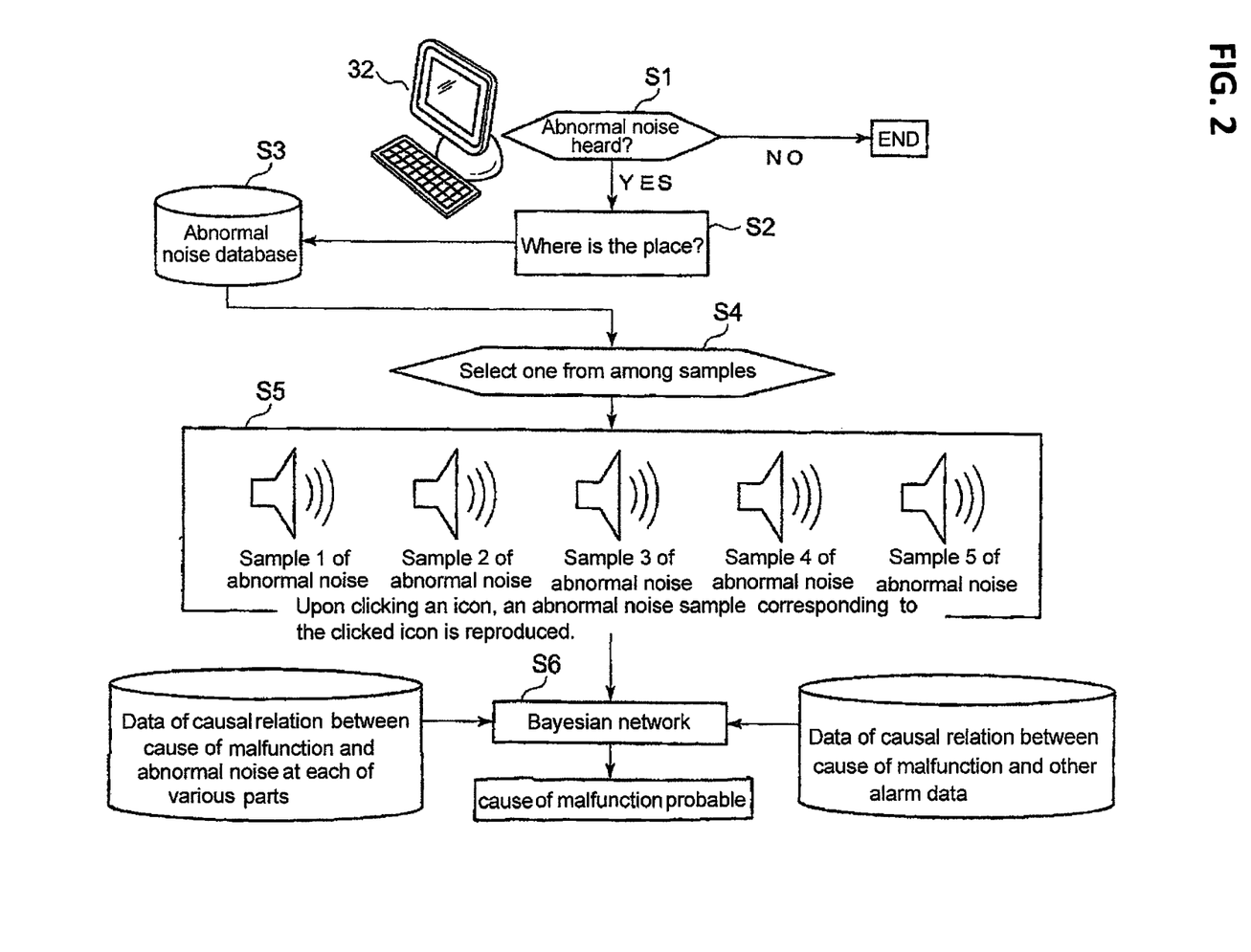
FIG. 2 is a flow chart showing inputting of acoustic data.

Inputting of the acoustic data will be explained referring to FIG. 2 showing a flow chart of inputting acoustic data. When the operator of the plant 2 receives notification that the alarm is emitted, the operator activates the client terminal 32 located near the plant 2 and prepares to input the acoustic data to the terminal 32 according to the flow chart of FIG. 2. Then the operator judges whether abnormal noise is heard from the operating gas turbine or not in step S1.

When "NO" in step S1, that is, when it is judged that abnormal noise is not heard, the operator does not input acoustic data and proceeds to "END". When "YES" in step S1, that is, when it is judged that abnormal noise is heard, the operator advances to step S2 and selects a place from where the abnormal noise is emitting.

When the noise emitting place is selected in step S2, samples of abnormal noises are inputted to the client terminal 32 from an abnormal noise database in which abnormal noises that occur in each of various parts of the gas turbine when malfunction occurs are provided beforehand.

In step S4, a plurality (five in the embodiment of FIG. 2) of icons are displayed with a message "select an abnormal noise". Step S3 and step S4 proceed in the client terminal 32 automatically, and the operator is not required to operate the terminal.

When the icons and message are displayed in step S4, the operator clicks the icons one by one in step S5. Upon clicking an icon, an abnormal noise sample corresponding to the clicked icon is reproduced. The operator clicks all the icons one by one and hears all the samples of abnormal noises, and select an abnormal noise most similar to the abnormal noise emitted from the gas turbine. When the most similar noise is selected in step S5, the data of the selected sample is sent to the Bayesian network system 30 via VPN 33 as shown in FIG. 1.

In step S6, in the Bayesian network system 30, the cause of the malfunction is inferred by the Bayesian network based on the data of causal relation between cause of malfunction and abnormal noise, data of causal relation between cause of malfunction and the other alarm data, and data of causal relation between cause of malfunction and combustion condition at each of various parts mentioned later. The result of reference is sent to the client terminal 32.

Figure 3:
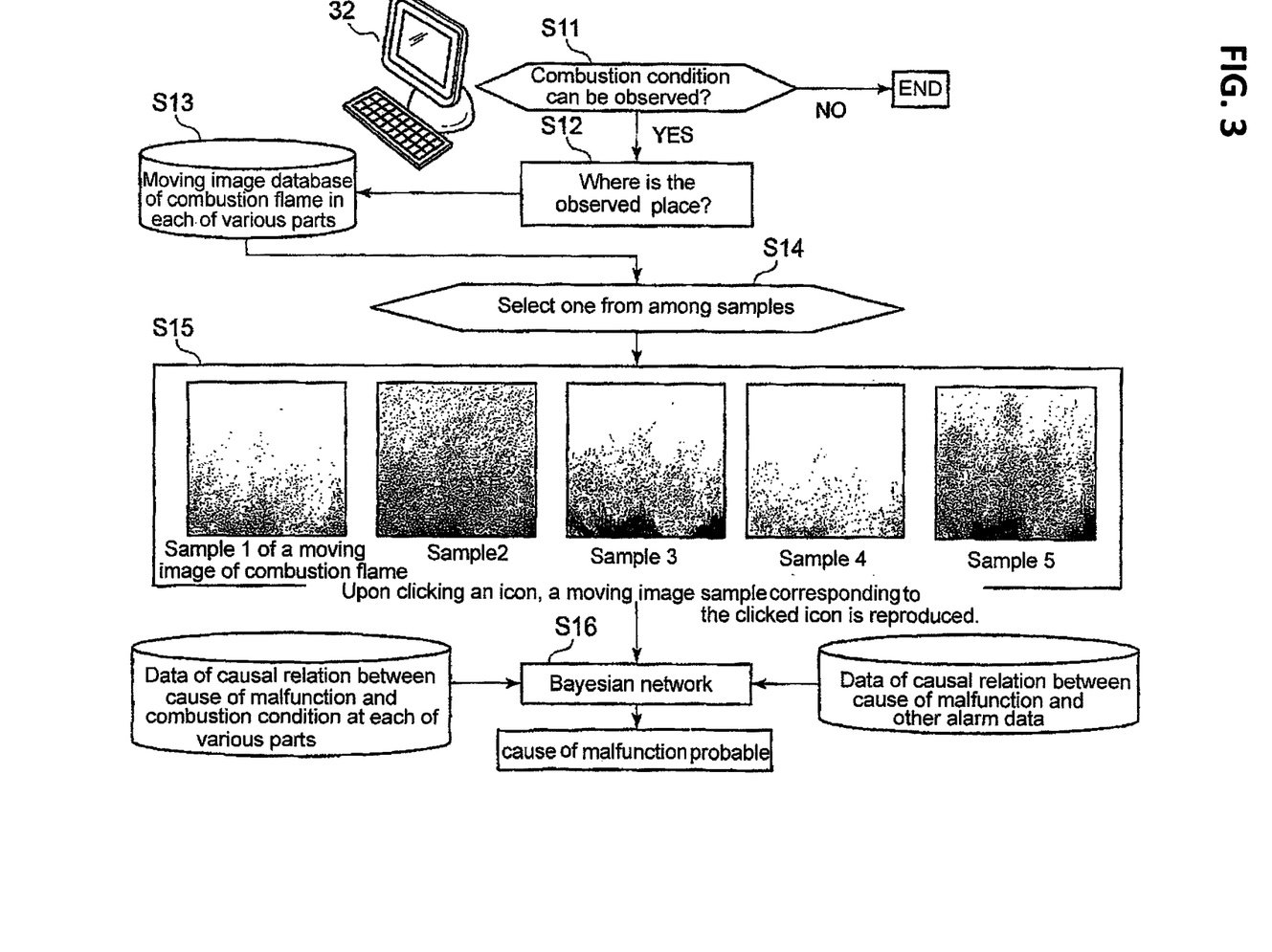
FIG. 3 is a flow chart showing inputting of combustion condition.

Next, inputting of the morphologic data will be explained referring to FIG. 3. Morphologic means here in the embodiment combustion condition. FIG. 3 is a flow chart of inputting of combustion condition.

The operator of the plant 2 activated the client terminal 32 located near the plant 2 when informed that the alarm is emitted and prepares for inputting morphologic data according to the flow chart of FIG. 3. Then the operator judges whether combustion condition of the operating gas turbine can be observed or not in step S11.

When "NO" in step S11, i.e. when it is judged that combustion condition can not be observed, the operator does not input morphologic data and proceed to "END". When "YES" in step S11, i.e. when it is judged that combustion condition can be observed, the operator advances to step S12 and selects a place where combustion condition can be observed.

When the place where combustion condition can be observed is selected in step S12, samples of moving images of combustion flame are inputted to the client terminal 32 from an combustion flame image database in which moving images of combustion flames that occur in each of various parts of the gas turbine when malfunction occurs are provided beforehand.

In step S14, a plurality (five in the embodiment of FIG. 2) of icons are displayed with a message "select a combustion condition that can be observed". Step S13 and step S14 proceed in the client terminal 32 automatically, and the operator is not required to operate the terminal.

When the icons and message are displayed in step S14, the operator clicks the icons one by one in step S15. Upon clicking an icon, a moving image sample corresponding to the clicked icon is reproduced. The operator clicks all the icons one by one and observes all the samples of moving images of combustion flame, and select a moving image most similar to the moving image of the combustion flame observed in the selected part of the gas turbine. When the most similar moving image is selected in step S15, the data of the selected sample is sent to the Bayesian network system 30 via VPN 33 as shown in FIG. 1.

In step S16, in the Bayesian network system 30, the cause of the malfunction is inferred by the Bayesian network based on the data of causal relation between cause of malfunction and combustion condition at each of various parts, data of causal relation between cause of malfunction and the other alarm data, and data of causal relation between cause of malfunction and abnormal noise. The result of reference is sent to the client terminal 32. By the way, step 16 is common to step 6 in the flow chart shown in FIG. 2.

In this way, by providing samples of abnormal noises and moving images of combustion condition and allowing the operator to select a sample most similar to that occurring in the malfunctioning equipment, data of abnormal noise and combustion condition relating to cause of malfunction which useful for unfolding cause of malfunction of the concrete equipment but difficult to represent numerically, can be collected excluding subjectivity as much as possible.

By adding data of abnormal noise and combustion condition relating to malfunction corrected with subjectivity excluded as much as possible to the nodes of the Bayesian network, and performing inference of cause of malfunction of equipment based on the data of abnormal noise and combustion condition relating to malfunction and other malfunction data obtained by the monitoring means, accuracy of inference of cause of malfunction can be improved.

Further, to the Bayesian network system 30 is inputted a database 34 of malfunction of all units and actual modifications or repairs performed after the occurrence of the malfunction of the equipment. Here, the units are devices or parts composing the gas turbine in the plant 2.

Figure 4:
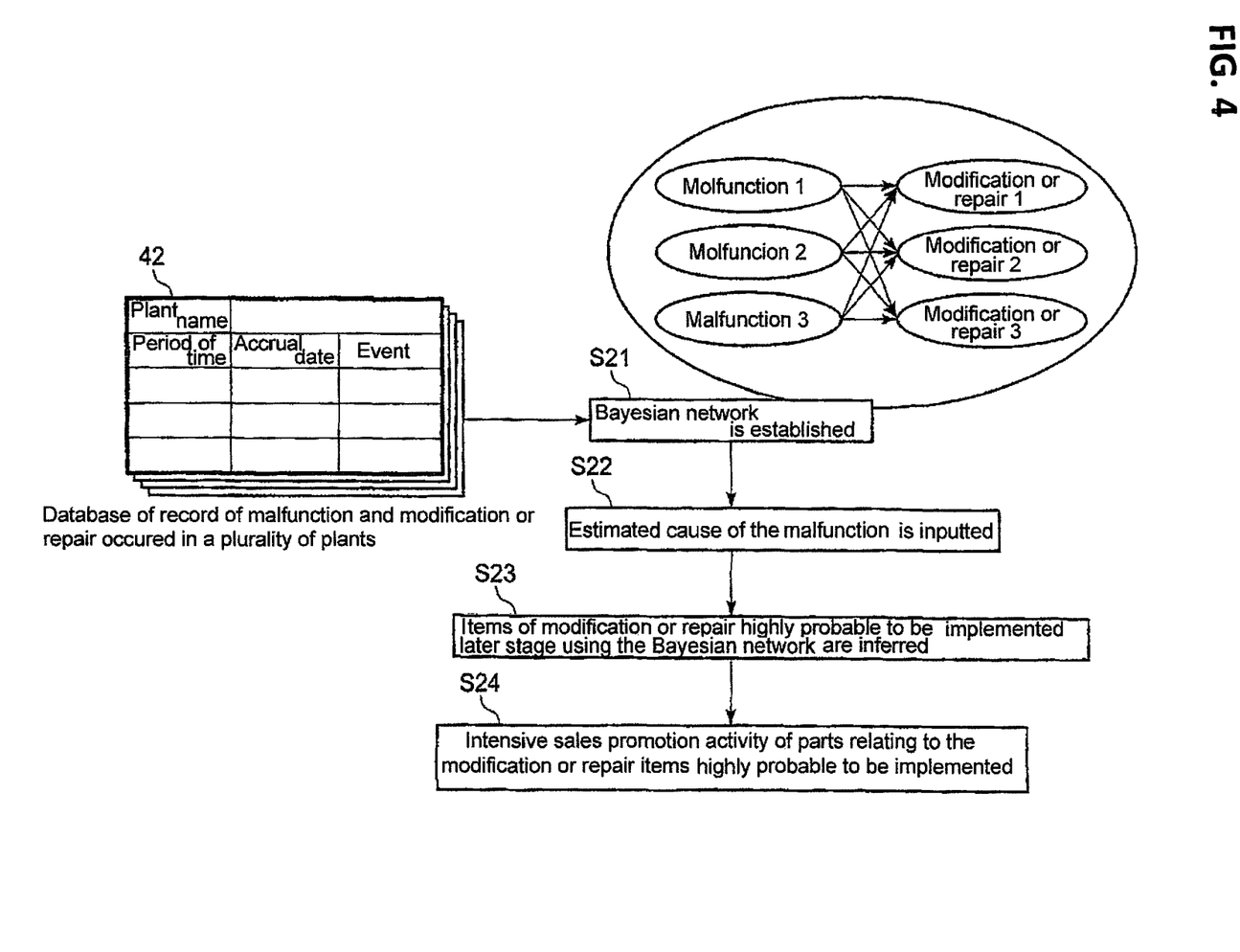
FIG. 4 is a flow chart showing inputting of a database of past records of malfunction of all units and past records of equipment modification or repair and outputting the results.

Concerning data base of malfunction of all the units and actual modifications or repairs of the equipment will be explained referring to FIG. 4. FIG. 4 is a flow chart showing inputting of a database of past records of malfunction of all units and past records of equipment modification or repair and outputting of the results.

All of the steps of a procedure shown in FIG. 4 are carried out in the remote control room 12.

A database 42 of causes of malfunction occurred in a plurality of plants managed in the remote managing room 12 and record of modification or repair implemented by plant users after the occurrence of the malfunction is inputted to the Bayesian network system 30 in step S21, and causal relation between causes of malfunction and the record of modification or repair is established in a Bayesian network. This Bayesian network is established separately from the Bayesian network used to infer the cause of malfunction described before, and is hereunder referred to as the second Bayesian network.

When malfunction occurs in a plant of client managed in the remote managing room 12 and cause of the malfunction is inferred, as explained referring to FIGS. 2 and 3, the estimated cause of the malfunction is inputted to the second Bayesian network in step S22.

When the cause of the malfunction is inputted in step S22, the user of the plant in which the malfunction has occurred infers items of modification or repair highly probable to be implemented later stage and probability of implementing the modification or repair using the Bayesian network established in step S21 in step S23.

When probability of each item of modification or repair which is highly probable to be implemented later stage is inferred, the inference of cause of the malfunction and the modification or repair items highly probable to be implemented later stage are offered to the plant user in step S24, and intensive sales promotion activity of parts relating to the modifications or repairs is carried out.

As the plant user can obtain the inference of cause of the malfunction and concurrently information concerning modification or repair of the plant, the plant user can take rapid action against the malfunction.

On the other hand, the plant maker performing the remote managing can offer the inference of the cause of malfunction and at the same time the highly accurate inference of probability of modification or repair to be implemented later stage to the plant user, so, the plant maker can timely promote sales of parts required for the modification or repair.

Furthermore, a trouble data 36 (see FIG. 1) containing data of period of operation stop due to trouble, recovery work, etc. is inputted in the Bayesian network system 30.

Trouble data 36 and its utilization will be explained referring to FIG. 5.

Figure 5:
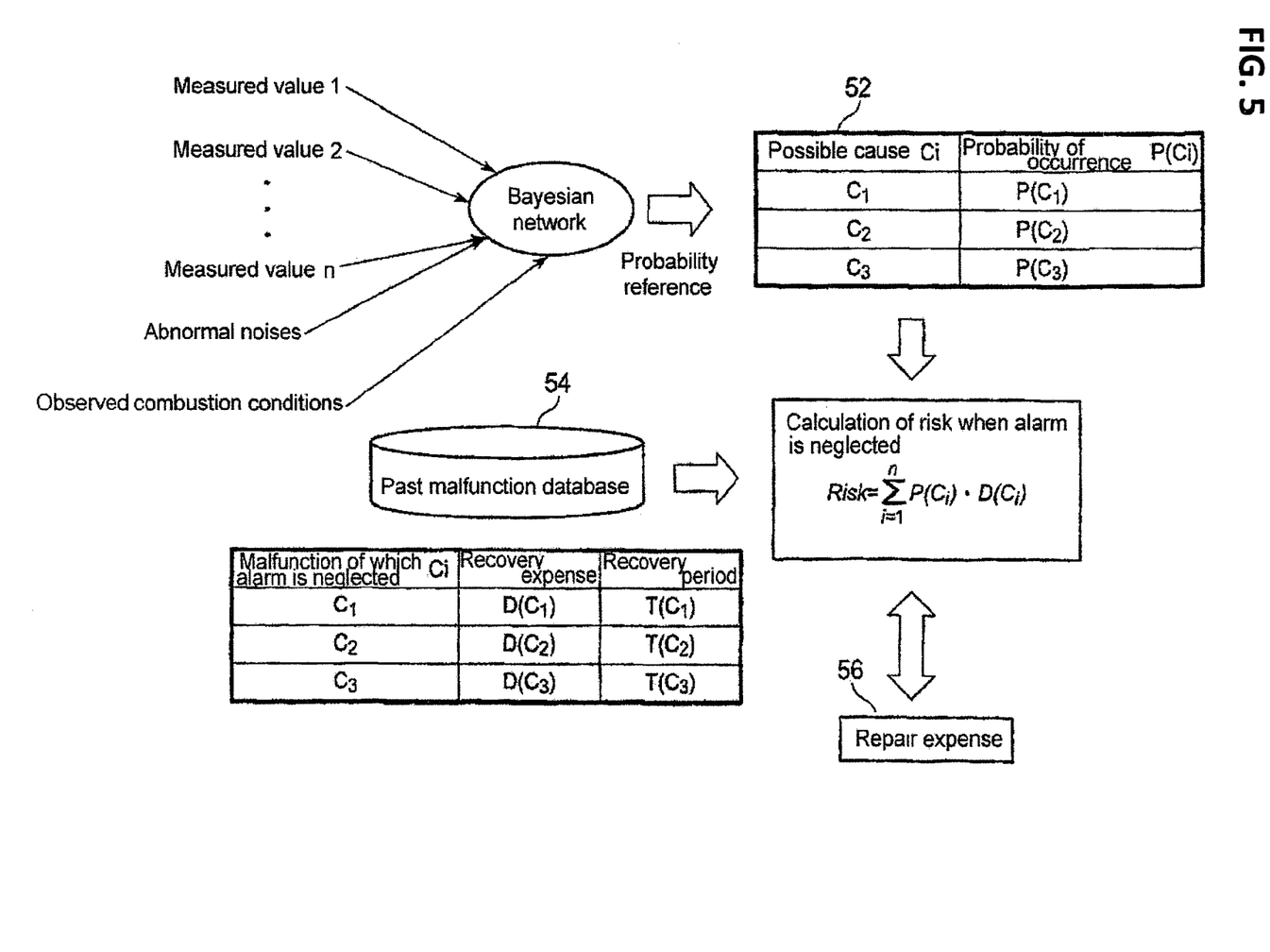
FIG. 5 is a drawing for explaining inputting accident data and utilization thereof.

When measurement results of the measuring instruments 4 in the plant 2 shown in FIG. 1 are sent to the Bayesian network system 30 via the data server for remote monitoring 6, remote monitoring server 16, and so on; abnormal noises explained referring to FIG. 2; and combustion conditions explained referring to FIG. 3 are inputted to the Bayesian network 30, cause of malfunction is inferred as mentioned above, and further causes of malfunction $C_i$ (i=1, 2, 3, . . . ) and probability $P_i(C_i)$ of a cause $C_i$ are inferred as represented in a table 52 in FIG. 5.

Expenses $D(C_i)$ (i=1, 2, 3, . . . ) required for recovery when the malfunction was neglected and no action was taken in past times against a cause $C_i$ and period $T(C_i)$ (i=1, 2, 3, . . . ) required for recovery are prepared beforehand as a past malfunction database 54.

From the probability inference table 52 estimated by the Bayesian network system 30 and the past malfunction database 54 can be calculated by the following formula (1) a risk cost (Risk_cost) to be born when the alarm telling that malfunction has occurred is neglected.

$$\text{Risk\_cost} = \sum_1^n P(C_i)D(C_i) \quad (1)$$

By calculating a repair expense 56 required to repair the present malfunction and comparing it with the risk cost to be born when the alarm is neglected (Risk_cost) calculated by the formula (1), whether the malfunction just occurred should be repaired early or not can be judged based on quantitative inference, so judgment becomes easier.

Furthermore, from the probability inference table 52 estimated by the Bayesian network system 30 and the past malfunction database 54 can be calculated by the following formula (2) a risk recovery period for repairs (Risk_period) when the alarm telling that malfunction has occurred is neglected.

$$\text{Risk\_period} = \sum_{1}^{n} P(C_i)T(C_i) \qquad (2)$$

By calculating a recovering period required to repair the plant and comparing it with the risk recovery period for repairs calculated by the formula (2) when the alarm is neglected (Risk_period), whether the malfunction just occurred should be repaired early or not can be judged based on quantitative inference, so judgment becomes easier.

As mentioned above, the plant maker performing remote managing can inform the client whether it is most appropriate from a viewpoint of lifecycle cost to repair the malfunction just occurred early or not can be judged easier and quantitative judgment becomes possible. Therefore, reliability of the maintenance expert of the plant maker is improved.

Further, a time series data 38 of malfunction of all units is inputted in addition to the measured results of the measuring instruments 4, abnormal noises, and combustion conditions.

Figure 6:
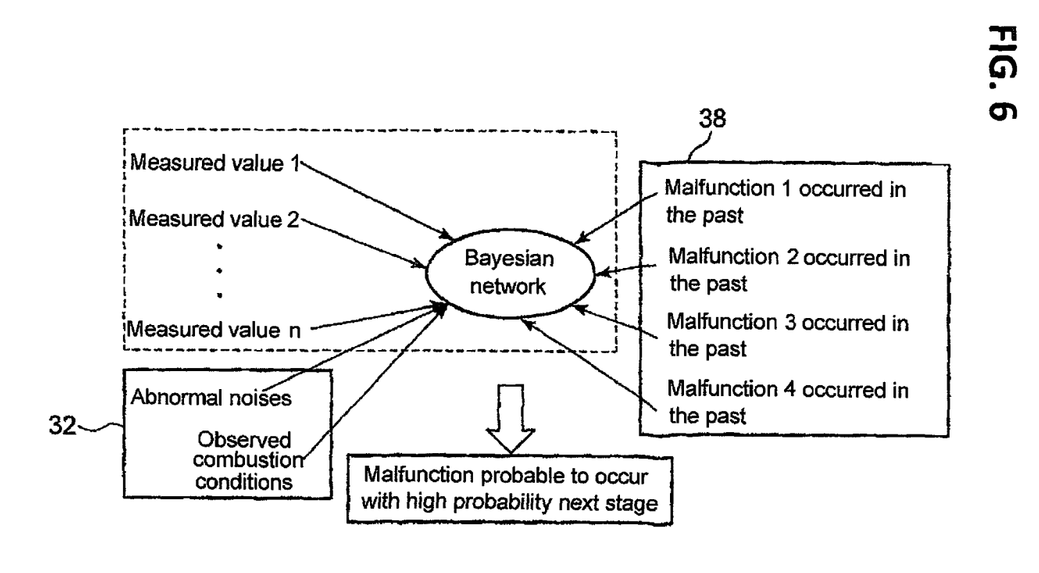
FIG. 6 is a drawing for explaining utilization of time-series data of malfunction of all units.

The time series data of malfunction of all units 38 will be explained referring to FIG. 6.

The time series data of malfunction of all units 38 means a data in which malfunctions occurred in past times in each of the units composing the plant are arranged in time series of occurrence.

By inputting the time series data of malfunction of all units 38 to the Bayesian network system 30, when malfunction occurs or likely to occur, malfunction probable to occur next time can be inferred. By referring to the inference and inspecting whether malfunction probable to occur next is likely to occur or not, measures to meet the situation can be taken in early stage. When some malfunction occurs, malfunction apt to occur next can be inferred, so, actually occurred malfunctions can be selected as inspection items in periodical inspection of the equipment, and inspection can be carried out efficiently.

By inputting an investigation result of causes 40, which is the result of investigation of the causes of malfunctions occurred actually, to the Bayesian network system 30, and updating the probability values of the probability table subject to conditions between each node in the Bayesian network based on whether the cause of malfunction inferred by the Bayesian network is correct or not, the probability table subject to conditions can be updated and inference accuracy is improved.

INDUSTRIAL APPLICABILITY

It becomes possible that a method for trouble managing in equipment is utilized, with which optimal timing of repairing the equipment and occurrence of malfunction probable to occur concurrently with present malfunction or later stage can be inferred with sufficient accuracy, and which can be adopted for large-scale equipment used in a plant.

The invention claimed is:

1. A system for trouble managing of equipment used in a plant, the system comprising:
   a monitoring device for monitoring an operating condition of the equipment:
   a memory device for storing data concerning the operating condition, and the memory device in which a plurality of acoustic data corresponding to abnormal noises of the equipment and a plurality of morphologic data corresponding to moving images of combustion condition of the equipment being previously stored;
   a first outputting device for outputting the plurality of acoustic data;
   a first selecting device for selecting desired acoustic data from the outputted acoustic data of the first outputting device;
   a second outputting device for output the plurality of morphologic data;
   a second selecting device for selecting desired morphologic data from the outputted morphologic data of the second outputting device;
   an inferring device for, when an abnormal signal is detected by the monitoring device, receiving the stored data corresponding to the abnormal signal from the memory device, adding to the node each of the desired acoustic data selected by the first selecting device and the desired morphologic data selected by the second selecting device, and performing inference of cause of the malfunction of the equipment by a first Bayesian network based on the nodes.

2. The system for trouble managing of equipment used in a plant according to claim 1, wherein the inferring device is configured to:
   establish a second Bayesian network concerning correlation between the cause inferred by the first Bayesian network and actual implemented repair corresponding to the cause; and
   infer measure against the cause inferred by the first Bayesian network based on the second Bayesian network.

3. The system for trouble managing of equipment used in a plant according to claim 1, wherein
   the memory device is further configured to store cause of malfunction of the equipment or analogous equipment in past times and expense required to repair the equipment or analogous equipment in a case appropriate action was not taken as a database,
   the inferring device is configured to:
   perform inference of probability of occurrence of malfunction which may occur if present malfunction is neglected by the first Bayesian network base on the database: and
   calculate risk cost by multiplying the inferred probability by the expense required to repair in a case appropriate action was not taken responding to the inference of cause of malfunction.

4. The system for trouble managing of equipment used in a plant according to claim 3, wherein
   the inferring device is configured to:
   estimate the expense to repair the present malfunction: and
   compare the expense with the risk cost.

5. The system for trouble managing of equipment used in a plant according to claim 1, wherein
the inferring device is configured to:
input a time series data in which the malfunctions occurred in each unit of the plant are inputted in order of time to the first Bayesian network: and
perform the inference of causes of malfunctions highly probable to occur next to the present malfunction and probabilities of their occurrence.

* * * * *